United States Patent [19]

Lotz

[11] Patent Number: 4,478,057
[45] Date of Patent: Oct. 23, 1984

[54] CONTINUOUSLY OPERATING AN ADSORPTION REFRIGERATION PLANT, ESPECIALLY FOR OPERATION BY WASTE HEAT OF COMBUSTION ENGINES OR THE LIKE

[75] Inventor: Helmut Lotz, Gingen, Fed. Rep. of Germany

[73] Assignee: Bosch-Siemens Hausgeraete GmbH, Stuttgart, Fed. Rep. of Germany

[21] Appl. No.: 521,707

[22] Filed: Aug. 9, 1983

[30] Foreign Application Priority Data

Aug. 9, 1982 [DE] Fed. Rep. of Germany ....... 3229646

[51] Int. Cl.$^3$ ............................................. F25B 17/08
[52] U.S. Cl. ...................................... 62/480; 62/238.3
[58] Field of Search ................ 62/478, 480, 79, 238.3

[56] References Cited

U.S. PATENT DOCUMENTS

| | | | |
|---|---|---|---|
| 2,234,306 | 3/1941 | Jurasek | .................................. 62/478 |
| 4,121,432 | 10/1978 | Weil et al. | ........................ 62/480 X |
| 4,152,901 | 5/1979 | Munters | ............................ 62/480 X |
| 4,184,338 | 1/1980 | Bennett | ............................. 62/480 X |

FOREIGN PATENT DOCUMENTS 1018022 12/1952 France ................................... 62/480

Primary Examiner—Lloyd L. King
Attorney, Agent, or Firm—Herbert L. Lerner; Laurence A. Greenberg

[57] ABSTRACT

Continuously operating adsorption refrigeration plant, comprising a gas-tight housing having at least one expeller chamber and at least one adsorption chamber disposed therein sequentially following each other in a close loop, sealing gates disposed between the chambers for preventing an uninhibited exchange of gaseous coolant between the chambers, an endless structure disposed in the housing including carriers for solid adsorbent of a coolant and connection members spacing the carriers apart from each other, the carriers being movable one after the other through the chambers of the housing.

14 Claims, 11 Drawing Figures

CONTINUOUSLY OPERATING AN ADSORPTION REFRIGERATION PLANT, ESPECIALLY FOR OPERATION BY WASTE HEAT OF COMBUSTION ENGINES OR THE LIKE

The invention relates to a continuously operating adsorption refrigeration plant, especially being operated by waste heat of combustion motors or the like, including a transport device which moves a solid adsorbent for a coolant in a closed cycle having at least one expeller zone and an adsorption zone cyclically following each other in a gas-tight housing, the housing being subdivided into chambers that are sealed with respect to each other by a device for avoiding an uninhibited exchange of a gaseous coolant.

A continuously operating adsorption refrigerating plant is known from German Patent DE-PS No. 429,289, in which a flowable granular substance serves as a solid adsorbent that is sequentially transported through the expeller and adsorption zones and is used again and again in a closed cycle. In such a device, the overflow of coolant in the vapor state is avoided by filling the fluidic adsorbent in vertically positioned pipe sections. A complicated mechanical conveying apparatus is required with several feed screws and a number of bucket wheels and impeller wheels which are highly technical, for transporting the adsorbent in the conventional device. Therefore, the manufacture of such a continuously operating adsorption refrigerating plant becomes extremely costly, and consequently uneconomical. The numerous moving parts of the transportation apparatus in this prior art refrigeration plant are also likely to malfunction, and require high maintenance costs. Furthermore, in the conventional refrigeration plant, the danger exists that the system will become plugged-up by moist adsorbent material, which especially tends to form lumps in the vertical pipe sections which are used to avoid gas leakage between the individual zones.

These disadvantages of the transport device proposed in the above-mentioned German Patent are most likely the reason that the continuously operating adsorption refrigeration plant using this transport device has never achieved any practical recognition, and therefore has remained almost unknown, even among those experienced in the art.

It is accordingly an object of the invention to provide a continuously operating adsorption refrigeration plant, especially operated by waste heat of combustion motors or the like, which overcomes the hereinafore-mentioned disadvantages of the heretofore-known devices of this general type, and to do so in such a way that it can be manufactured from simple parts and can be used with great reliability, especially for operation with the waste heat of combustion engines and the like.

With the foregoing and other objects in view there is provided, in accordance with the invention, a continuously operating adsorption refrigeration plant, especially for operation with waste heat of combustion motors or the like, including a gas-tight housing having at least one expeller chamber and at least one adsorption chamber disposed therein sequentially hollowing each other in a closed loop sealing gates disposed between the chambers for preventing an uninhibited exchange of gaseous coolant between the chambers, and endless structure disposed in the housing including a transport device in the form of carriers for solid adsorbent of a coolant and connection members spacing the carriers apart from each other, the carriers being movable one after the other through the chambers of the housing.

Due to the provision of the invention, wherein the solid adsorbent is disposed on carriers which alternate sequentially with connection members forming an endless structure, the problems associated with the transport of solid adsorbent in continuously operating refrigeration plant, can be solved in a simple way.

In accordance with another feature of the invention, the endless structure is in the form of a relatively thin annular disc, the carriers are segments of the disc and the connection members are sections of the disc disposed between the carriers.

These features permit the realization of the required transportation of the solid adsorbent in a closed circuit or cycle, in an especially simple and reliable way.

In accordance with an added feature of the invention, the connection members are in the form of an annular ring with a relatively small cross section and the carriers are in the form of segments of an annular disc spaced apart from each other on the annular ring.

Due to the structuring of the connection member as a circular ring with a small cross section, the heat exchange between the segments carrying the solid adsorbent is successfully reduced, and the losses caused by such a heat exchange are considerably diminished.

Losses due to heat exchange between the individual segments can be further reduced if the connection members are formed of a poor heat conducting material.

In accordance with an additional feature of the invention, the housing is an annular chamber having the shape of a flattened torus and having a cross section corresponding to the dimensions of the carriers and connection members.

In such a housing, an especially simple guide for the segments carrying the adsorbent will be provided if the carriers have mutually opposite edges, and the annular chamber of the housing has a wall with an interior surface, and including guides disposed on the interior surface for the opposite edges of the carriers.

In accordance with yet another feature of the invention, the sealing gates are in the form of a diametrically opposite flexible intermediate members, such as corrugated tubes having dimensions corresponding to the dimensions of the carriers and having interior surfaces, and including sealing sliders disposed on the interior surfaces, the sealing sliders being movable in opposite directions for varying the distance therebetween. The cross section of the corrugated tubes can be varied with roller forks, or the like.

In accordance with yet a further feature of the invention, the sealing gates are in the form of sealing sliders being movable in opposite directions and being supported in recesses formed in the housing at locations corresponding to the dimensions of the carriers.

In accordance with yet an additional feature of the invention there are provided compression springs biasing the sealing sliders, and cams disposed on the connection members for controlling the movement of the sealing sliders.

In accordance with yet an added feature of the invention there is provided at least one other housing in vicinity of and coaxial to the first-mentioned housing being combined with the first-mentioned housing to form a battery of housings.

In accordance with a concomitant feature of the invention there are provided heat exchanging ribs protruding outwardly from the housing in vicinity of the expeller chamber.

Other features which are considered as characteristic for the invention are set forth in the appended claims.

Although the invention is illustrated and described herein as embodied in continuously operating adsorption refrigerating plain, especially operated by waste heat of combustion motors or the like, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages there of will be best understood from the following description of specific embodiments when read in connection with the accompanying drawings, in which.

Figure 1:
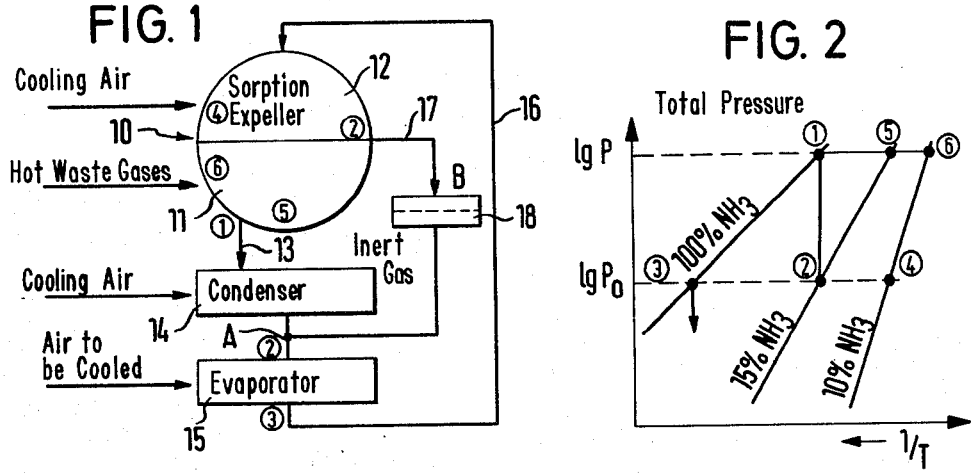
FIG. 1 is a simplified block diagram of a continuously operating adsorption refrigeration plant with $NH_3$ as the freezing mixture and using $H_2$ as the inert gas.

Referring now to the figures of the drawing and first particularly to the block diagram according to FIG. 1, there is seen a sorption expeller 10 which is diagrammatically represented as a circular disc. The lower half of the disc, for example, is exposed to hot waste gas from a combustion motor and serves as an expeller zone 11, while the upper half thereof is exposed to cooling air and serves as an adsorption zone 12. The expeller zone 11 is connected by a pipeline 13 to a condenser 14, which is also air cooled. From the condenser 14, the liquid mixture is conducted to an evaporator 15, where it evaporates while absorbing heat from the surroundings. The evaporated mixture is then reconducted in the vapor state through a line 16 back into the adsorption zone 12.

A line 17 is additionally attached to the adsorption zone 12 of the sorption expeller 10. The line 17 leads to a node point A through a container 18 which is provided with a semipermeable intermediate wall. The node point A lies in the connecting line between the condenser 14 and the evaporator 15. The semipermeable intermediate wall which is impermeable to the coolant $NH_3$, may be formed of palladium, for example.

Figure 2:
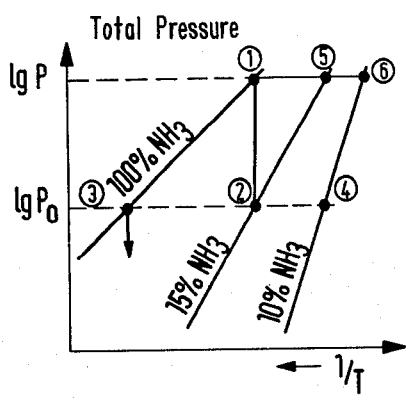
FIG. 2 is a simplified lg P-1/T graph which explains the operation of the adsorption refrigerating machine according to FIG. 1.

The operating characteristic of the continuously operating adsorption refrigeration plant shown as a block diagram in FIG. 1, is explained below with the aid of the lg P-1/T graph for operation with $NH_3$ as a coolant and with the presence of $H_2$ as the inert gas in FIG. 2, FIGS. 1 and 2 show different states of the coolant with reference numerals 1–6. After expelling the coolant which is bound to the solid adsorbent in the expeller zone 11 of the sorption expeller 10, the $NH_3$ rich gas in the state (1) flows to the condenser 14, where it is liquified by cooling air. For example, the hot waste gases of a combustion motor can be utilized for expelling the coolant in the sorption expeller. For simplification, the concentration of the $NH_3$ expelled in this manner is assumed to be 100%. At the node point A, between the condenser 14 and the evaporator 15, $H_2$ is added as the inert gas through the line 17, which lowers the partial pressure of the $NH_3$ to an evaporation pressure $P_o$, so that an $NH_3$ concentration of 15% results, for example, corresponding to state (2). The pressure drop which is thus achieved results in a lower evaporation temperature, which is approximately determined by point (3). Consequently, the refrigerating capacity of the evaporating $NH_3$ can be utilized. For example, it can serve for cooling the air for the passenger compartment or storage space of a vehicle driven by the combustion motor. The evaporated $NH_3$ with its $H_2$ part is suctioned up by the adsorbent in the adsorption zone 12 of the sorption expeller, and adsorbed there. After the expelling phase, the adsorbent is in an equilibrium state of about 10% $NH_3$, corresponding to point (4). During the adsorption phase, the adsorbent becomes loaded with an $NH_3$ content of about 15%, to a state corresponding to point (2) and the adsorption heat is removed by cooling air. The $H_2$ does not become adsorbed, but is instead conducted to the point A during the expelling process through the semipermeable wall (i.e. impermeable to $NH_3$) in the container 18. Since the overall pressure in the system is uniform, the flow of liquids is caused by density differences in the conventional manner, similar to an adsorption refrigeration chest. During the expelling phase which takes place after the adsorption, and is caused by the hot waste gases, $NH_3$ rich gas in the state (1) is again discharged, while the adsorbent which is in an $NH_3$ poor state (6) after cooling by the cooling air in the state (4), is again ready for adsorption.

Figure 3:
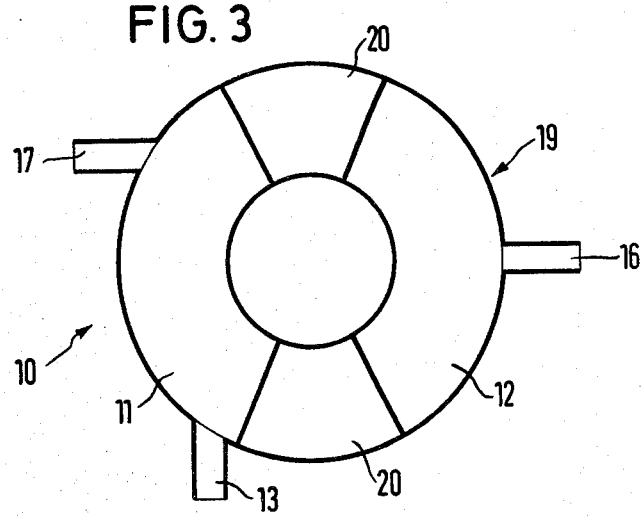
FIG. 3 is a diagrammatic plan view of a typical embodiment of a sorption-expeller, wherein chambers are formed in an annular, gas-tight housing and the chambers are mutually separated by locks or sluices and serve as respective expelling or adsorption zones.
Figure 4:
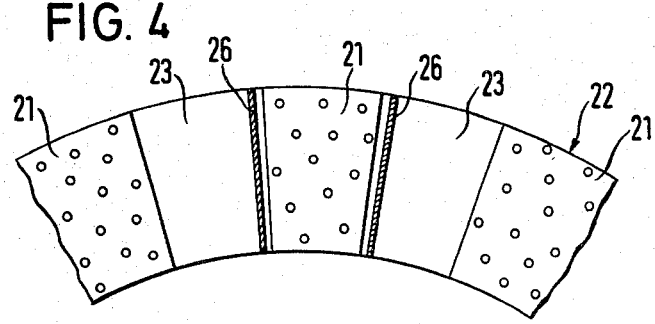
FIG. 4 is a fragmentary, partially cross-sectional view of a flat circular ring subdivided into individual segments, on which a solid adsorbent is disposed at equal spacings with free segments disposed therebetween serving as sealing areas.
Figure 6:
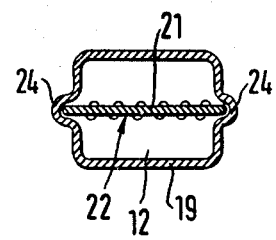
FIG. 6 is a cross-sectional view taken along the line VI—VI in FIG. 5, in the direction of the arrows.
Figure 8:
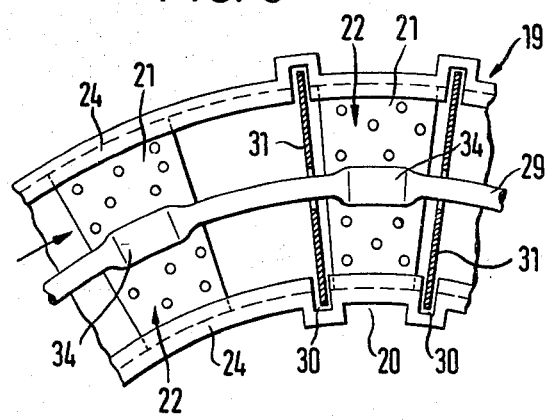
FIG. 8 is a fragmentary, partly cross-sectional view of a meridian section through a second embodiment of the annular sorption expeller, with a differently construction sluice.

In order to guarantee the continuous operation of the adsorption refrigeration plant, special structural provisions must be followed in the sorption expeller 10. According to the first embodiment which is diagrammatically shown in FIG. 3, the sorption expeller 10 is surrounded by a gas-tight housing 19, which is constructed as an annular chamber in the form of a flattened, hollow torus. The interior space of the gas-tight housing 19 is divided by sealing gates or sluices 20 into chambers which are mutually separated and diametrically opposite each other. The chamber to the right in FIG. 3 serves as the adsorption zone 12, while the opposite chamber to the left serves as the expeller zone 11. The solid adsorbent required for the operation of the continuously operating refrigeration plants is disposed on carrier elements which are spaced apart from each other with connecting members therebetween forming an endless assembly. As shown especially clearly in FIG. 4, these carrier elments are constructed as segments 21 of a relatively thin annular disc 22, and portions 23 which lie between the segments 21 serve as connecting members. The annular disc is rotated inside the gas-tight housing 19 by a conventional non-illustrated drive. For example, a gas-tightly attached electric motor can serve as the drive which rotates the annular disc, indirectly through a friction drive, or the like. However, the drive may also be constructed as a magnetic coupling, wherein one half of the coupling lies outside the gas-tight housing 19 and the other half is formed by the annular disc. As shown in FIGS. 6 and 8, the wall of the annular chamber formed by the gas-tight housing 19, is provided at the inside thereof with guides 24. The guides 24 are constructed as stiffening corrugates protruding to the outside and disposed opposite each other, so that the annular disc 22 which carries the solid adsorbent is guided and retained at the rim thereof.

In the first embodiment of the invention shown in FIGS. 4 to 7, the sealing gates or sluices 20 are formed by intermediate members in the form of corrugated tubes 25. The tubes 25 are inserted into the gas-tight housing 19 at diametrically opposite positions. The cross sections of the tubes 25 can be varied in the direction indicated by arrows in FIG. 5 by means of roller forks or the like, in such a manner that sealing sliders 26 disposed at the inside of the corrugated tube 25 move in opposing directions. Each sealing gate or sluice 20 has two sealing sliders 26 which move in mutually opposite directions. The sliders 26 are disposed in pairs and spaced apart by distances corresponding to the dimensions of the segments 21 which carry the solid absorbent.

Figure 5:
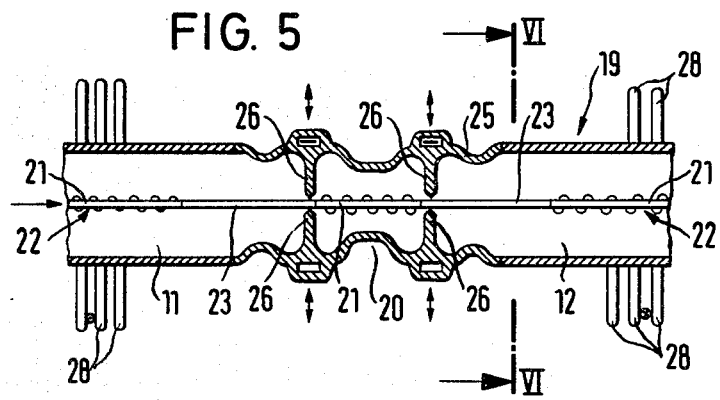
FIG. 5 is a fragmentary, vertical sectional view taken along the center line of a section of the annular sorption expeller according to FIG. 3, which is provided with a sluice.

In the embodiments according to FIGS. 4 to 7, the intermediate portions 23 disposed as connecting members between the segments 21, form sealing surfaces against which the sealing sliders 26 rest with sealing edges thereof, in the closed position. During the operation of the sorption expeller, the sealing sliders 26 are controlled in such a way that two of the sliders are always either open or closed in continuous sequence. In FIG. 5, both pairs of the sealing sliders forming the sealing gate or sluice 20 are closed and thus enclose or seal a segment 21 between each other which carries the solid adsorption material. Starting from the FIG. 5 embodiment, it is necessary for a further motion of the part of the annular disc 22 shown in FIG. 5 in direction of the arrow shown therein for the two sealing sliders positioned to the right to first open by lifting, so that the segment 21 disposed in the sealing gate or sluice can pass through. During this time, the sealing sliders 26 of the other pair slide with their sealing edges on the sealing surfaces 23 of the annular disc, until the approach of the next segment 21 lined with the solid adsorbent. As this sealing pair opens, the other closes, after the segment 21 with the solid adsorbent has glided through its sealing edges.

The sealing sliders 26 of the sealing gate or sluice 20 act like an air scoop in the manner described, preventing gaseous coolant or inert gas from leaking between the expeller zone 11 and the adsorption zone 12, except for a small amount of "diffusion-leakage gas". In order to make the small gas volume which is still carried along by the annular disc 22 as small as possible, it is necessary to construct the sealing gates or sluices 20 with as small a volume as possible.

Figure 7:
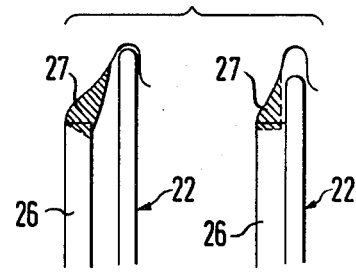
FIG. 7 is a pair of enlarged partly cross-sectional views of parts of the sluice according to FIG. 5 in two different operating states.
Figure 9:
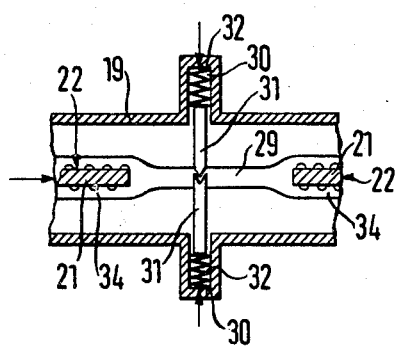
FIG. 9 is a vertical sectional view taken through the center line of the sorption expeller with one half of the sluice shown.
Figure 10:
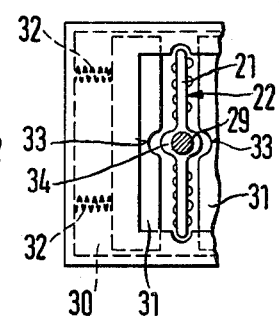
FIGS. 10 and 11 are radial sectional views taken through the sorption expeller according to FIGS. 8 and 9, respectively, showing different operating states of the parts of the sluice.
Figure 11:
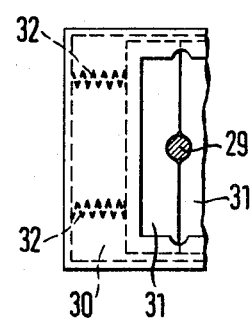

In the illustrated and described construction of the sealing gates or sluices 20 as corrugated tubes corresponding to the embodiment according to FIGS. 4 to 7, the leakages at the guides 24 caused by the pulsating motion due to cross-tension and cross-contraction, are compensated by additional sealing means which are shown in two motion phases in FIG. 7. According to this structure, a triangular segment 27 is movably attached to the ends of the sealing sliders 26, in such a manner that it overlaps the ends of the sliders and positions itself obliquely as the sealing slider is lifted. As the sealing slider 26 is lowered, the triangular segment positions itself against the annular disc 22 in the longitudinal continuation of the slider.

The two sealing gates or sluices separating the expeller zone 11 from the adsorption zone 12 are otherwise similarly constructed with equivalent structural elements. In order to maximally avoid a heat exchange between the expeller zone 11 and the adsorption zone 12 through the sealing gates or sluices 20, it is important to fabricate the corrugated tubes 25 of a material which has poor heat conduction properties.

During operation of the above-described continuously operating adsorption refrigeration plant, heat transfer to the expeller zone 11 is effected by ribs 28, only a few of which are diagrammatically illustrated in FIG. 5. These ribs 28 are exposed to the hot waste gases of a combustion motor, for example, which flow between guide surfaces over the expeller zone 11 of the sorption expeller, and therefore give off heat. The heat received by the ribs 28 in this manner flows to the corresponding wall section of the gas-tight housing 19, where it is transferred by radiation to the adsorbent on the corresponding segments of the annular disc which slowly rotates during operation. Logically, the heat transfer in the adsorption zone 12 takes place in reverse, so that the adsorption zone is closed by a gaseous or liquid cooling medium during operation. Tangential heat conduction occurs between the individual segments 21 lined with solid adsorbent. This heat conduction takes place through the interposed free portions of the annular disc 22 and is reduced by making the annular disc from a material which is a poor heat conductor. In some cases, the annular disc can be made from a highly temperature resistant synthetic material.

An advantageous construction of the sealing surfaces of the intermediate portions 23 is provided if the thickness thereof is greater than the thickness of the segments 21 including the adsorbent. In this way, the cross-motion of the sealing sliders 26 is reduced to a minimum. In the second embodiment of the invention shown in FIGS. 8 to 11, the solid adsorbent-carrying segments 21, which are similar to the segments 21 in the first embodiment, are connected to each other by a carrier in the form of a circular, wire-shaped connecting member 29, which has a small cross section. In this embodiment, pocket or recesses 30 are formed in vicinity of the sealing or sluice gates, which are also designated with reference numberal 20. The spacing between the pockets 30 corresponds to the dimensions of the segments 21, so that the sealing sliders which can move in opposing directions are supported in the recesses. In contrast to the sealing sliders 26 according to the first embodiment, in the second embodiment currently being described, compression spring 32 act upon sealing sliders 31. The compression springs 32 are disposed in the recesses 30, and press sealing edges of the sealing sliders 31 against each other. In this case, the sealing slider 31 have sealing edges which fit form-lockingly into each other. A form-locking connection is one in which the parts are locked together by virtue of their shape alone. The sealing edge of each of the sliders are also provided with a semicircular cutout 33 corresponding to the diameter of the wire serving as the connection member 29. In vicinity of the segments 21 which carry the solid adsorbent, the wire serving as the circular connecting member 29 is provided with comb or ridge-shaped thicker portions 34. The transition of the sections of the connecting member 29 to the ridge-shaped thickened portions between the segments 21, is gradual with little inclination. In this way, the connection member is capable of automatically moving the spring-loaded sealing sliders 31 like a cam during its slow rotation in direction of the arrow shown in FIG. 8.

In the above-described embodiment, it is practical to make the connection member 29 out of a wear resistant material, while the sealing sliders 31 can be made from a highly temperature resistant plastic, for example.

Deviating from the illustrated and described embodiments, a structure can be visualized wherein the adsorbent is disposed on carriers, which are interconnected by suitable connection links to form an endless chain and in which the chain is moved by a corresponding drive. In this case, siphons filled with a suitable fluid may serve as the sealing gates or sluices.

Due to the use of a solid adsorbent, the continuously operating adsorption refrigeration plant described in the preceding embodiment is completely independent of its spatial position, in contrast to adsorption refrigeration plants using a liquid or fluid adsorbent. This is true except for the necessity of driving the liquid column and the $H_2$ gas volume distributed therein, which causes the pressure drop and the fact that the evaporator and the condenser must be placed in a definite height relationship relative to each other. This relationship must be adjusted in such a way that an initial motion is caused by the fluid column generated in the condenser, and the further transport is effected by an $NH_3$ gas bubbles generated in the evaporator. The gas bubbles act on the vertical pipelines in the evaporator in the form of a gas bubble pump.

The above described refrigeration plant is especially suited for operation in vehicles driving by a combustion engine, because in such cases the waste heat of the combustion engine is sensible utilized.

The foregoing is a description corresponding, in substance, to German application No. P 32 29 646.0, dated Aug. 9, 1982, international priority of which is being claimed for the instant application, and which is hereby made part of this application. Any material discrepancies between the foregoing specification and the specification of the aforementioned corresponding German application are to be resolved in favor of the latter.

I claim:

1. Continuously operating adsorption refrigeration plant, comprising a gas-tight housing having at least one expeller chamber and at least one adsorption chamber disposed therein sequentially following each other in a closed loop, sealing gates disposed between said chambers for preventing an uninhibited exchange of gaseous coolant between said chambers, an endless structure disposed in said housing including carries for solid adsorbent of a coolant and connection members spacing said carriers apart from each other, said carriers being movable one after the other through said chambers of said housing.

2. Adsorption refrigeration plant according to claim 1, wherein said endless structure is in the form of a relatively thin annular disc, said carriers are segments of said disc and said connection members are sections of said disc disposed between said carriers.

3. Adsorption refrigeration plant according to claim 1, wherein said connection members are in the form of an annular ring with a relatively small cross section and said carriers are in the form of segments of an annular disc spaced apart from each other on said annular ring.

4. Adsorption refrigeration plant according to claim 1, wherein said connection members are formed of a poor heat conducting material.

5. Adsorption refrigeration plant according to claim 2, wherein said housing is an annular chamber having the shape of a flattened torus and having a cross section corresponding to the dimensions of said carrier and connection members.

6. Adsorption refrigeration plant according to claim 3, wherein said housing is an annular chamber having the shape of a flattened torus and having a cross section corresponding to the dimensions of said carriers and connection members.

7. Adsorption refrigeration plant according to claim 5, wherein said carriers have mutually opposite edges, and said annular chamber of said housing has a wall with an interior surface, and including guides disposed on said interior surface for said opposite edges of said carriers.

8. Adsorption refrigeration plant according to claim 2, wherein said sealing gates are in the form of diametrically opposite flexible intermediate members having dimensions corresponding to the dimensions of said carriers and having interior surfaces, and including sealing sliders disposed on said interior surfaces, said sealing sliders being movable in opposite directions for varying the distance therebetween.

9. Adsorption refrigeration plant according to claim 8, wherein said housing has a wall, and said intermediate members are corrugated tubes formed in said housing wall.

10. Adsorption refrigeration plant according to claim 3, wherein said sealing gates are in the form of sealing sliders being movable in opposite directions and being supported in recesses formed in said housing at locations corresponding to the dimensions of said carriers.

11. Adsorption refrigeration plant according to claim 10, including compression springs biasing said sealing sliders, and cams disposed on said connection members for controlling the movement of said sealing sliders.

12. Adsorption refrigeration plant according to claim 1, including at last one other housing in vicinity of and coaxial to said first-mentioned housing being combined with said first-mentioned housing to form a battery of housings.

13. Adsorption refrigeration plant according to claim 1, including heat exchanging ribs protruding outwardly from said housing in vicinity of said expeller chamber.

14. Adsorption refrigeration plant according to claim 1, including heat exchanging ribs protruding outwardly from said housing in vicinity of said adsorption chamber.

* * * * *